Aug. 13, 1935.        G. W. WOODS        2,011,100

FLUID CHOKE

Filed March 30, 1933

Gorham W. Woods INVENTOR

BY Jesse R. Stone

ATTORNEY

Patented Aug. 13, 1935

2,011,100

UNITED STATES PATENT OFFICE 2,011,100

FLUID CHOKE

Gorham W. Woods, Houston, Tex., assignor to Hughes Tool Company, Houston, Tex., a corporation of Texas Application March 30, 1933, Serial No. 663,567

8 Claims. (Cl. 62—122)

My invention relates to devices for restricting the passage of gaseous fluids under pressure through a fluid conducting line.

It is an object of the invention to provide a choke for high pressure gas or air lines to restrict the flow and reduce the pressure thereof in which the obstruction of the choke by frost or ice is prevented.

It is an object to cool the gaseous fluid before it reaches the choke and thus condense moisture therefrom so that the said moisture will not freeze about the orifice and thus tend to close it up.

I also aim to provide a nipple of heat insulating material on the downstream side of the choke orifice whereby the loss of heat at the upstream side may be partly eliminated and freezing at that point prevented.

I desire to provide a choke device in which freezing of moisture in the choke orifice may be prevented, so that the device will not clog in use and to also provide for clearing the same of moisture condensed therein when desired.

Figure 1:
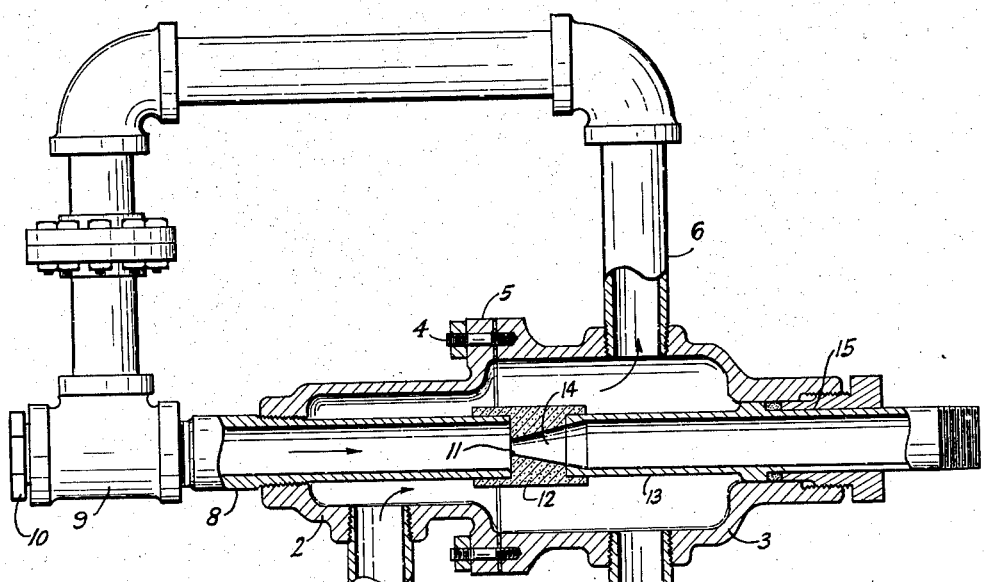

In the drawing herewith Fig. 1 is a side view partly in central vertical section of one form of my invention.

Figure 2:
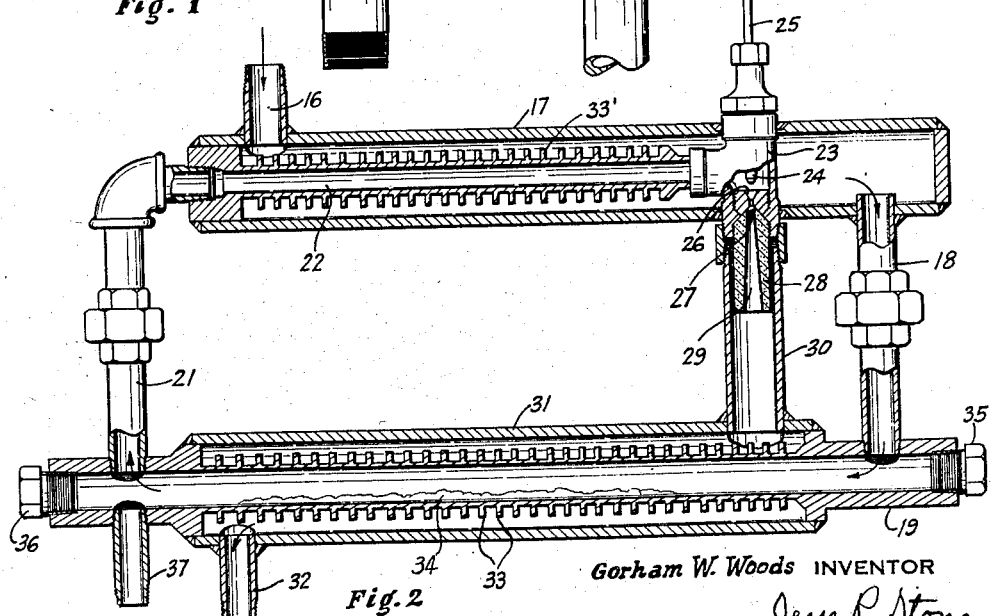

Fig. 2 is a similar view of a somewhat different embodiment of the invention.

In the Fig. 1 embodiment the incoming gaseous fluid under considerable pressure finds entrance through pipe 1 to the housing 2. Said housing is shown as made in two sections for purposes of assembly. The downstream section 3 is connected to the other by bolts or studs 4 engaging through radial flanges 5 on the two sections. The section 2 of the housing has two opposite openings to connect with the flow pipe 6 and the vent pipe 7 respectively.

The flow pipe conducts the gaseous fluid around to the through pipe 8 by way of the T 9 which is closed on its outer end by a plug 10 which may be removed for cleaning when necessary.

The through pipe connects with a nipple 12 having a choke orifice 11 at its upstream end, said nipple being positioned within the larger section 3 of the housing. Said coupling or nipple 12 is of heat insulating material and connects said pipe 8 with the outlet pipe 13. Said coupling has a passage 14 therethrough which flares outwardly away from the choke orifice and allows expansion of the gas passing through the orifice.

The outlet pipe 13 extends outwardly through the end wall of the housing and has a removable fluid tight fit therewith by way of the stuffing box 15.

In the operation of my choke the warm fluid entering through pipe 1 will warm the pipes 8 and 13 and the orifice 11 to some extent and will in turn be cooled materially so that moisture therein will condense out around the outer walls of the pipes. The gas will then return through the through pipe 8 to the orifice 11 and will there be checked in its flow and will issue from the downstream side of the orifice at greater velocity and at reduced pressure. The fluid will be cooled by the expansion thereof in the passage 14 and will tend to condense moisture still remaining in the fluid and as this cooling is in the open line, any frost forming will be blown along with the fluid downstream.

The cooling of the pipe 13 and the nipple 12 will not be communicated to any damaging extent to the orifice 11, because of the non-conducting nature of the heat insulating material of which the nipple is constructed. Hence, the orifice will not tend to freeze and will remain free of ice tending to form thereon.

In the embodiment disclosed in Fig. 2, the route taken by the gaseous fluid is somewhat longer. Said fluid will enter through the inlet pipe 16 and will pass through the housing 17 to the connecting pipe 18 to the pipe 19 which extends through the adjacent housing 31 to the pipe 21 which in turn connects with the pipe 22 which passes axially through the housing 17 to connect with the choke 23.

The choke 23 is of ordinary construction. It is of T-shape having a valve 24 movable by the stem 25 to and from a seat 26 leading to the orifice 27. The seat and orifice are formed in a removable annular nut threaded into the body of the choke.

There is a nipple 28 of heat insulating material on the downstream side of this orifice. Said nipple has a passage 29 therethrough which flares toward the downstream side. This nipple projects into the flow pipe 30 and the cooling of the expanding gas in said nipple is not conducted toward the orifice 26 on the upstream side thereof. Freezing vapor still left in the gas will be carried downstream into the casing 31 which houses the pipe 19 previously noted.

The gas from the orifice passes out of the casing 31 by way of the outlet pipe 32 to be employed as desired. In the casing 31, it cools the pipe 19 which may be formed with radial fins 33 to provide for more ready heat transfer. Thus moisture in the gaseous fluid passing through the pipe 19 would condense as snow at 34 and could be cleared out at any time by the removal of the end plugs 35 and 36 in the pipe 19 and forcing a rod therethrough or a jet of steam or the like. Also an outlet pipe is provided at 37 which may act as a drain but normally will be closed by a cap, valve or any similar well known means.

It is to be noted that the pipe 22 in the casing 17 is also formed with fins 33' for better exchange of heat through said pipe.

Thus, it will be noted that the gas entering from pipe 16 to pipe 17 will be cooled through the gas in pipe 22 and will pass to pipe 19 where it will be subjected to much greater cooling through contact with the sub-freezing temperature of pipe or casing 31 and will hence deliver up most of the moisture therein as seen at 34. The gas then passing through pipes 21 and 22 will be somewhat warmed before it reaches the choke 23, so that the upstream side of the choke will be warmer than the gas. After passing the orifice the gas will be greatly cooled as it expands at the nipple 28. As there is but a trace of moisture in the gaseous fluid at this point, there will be but slight condensation and that will take place in the nipple 28 and pipe 30 and will be carried on by the speed of flow. The choke member 26 will not be cooled below freezing because of the non-conducting character of the nipple 28 relative to heat.

Thus this embodiment will act to maintain the choke orifice clear of frozen moisture so that it will not clog in use.

It is to be noted that, in both of the embodiments herein disclosed, the moisture is eliminated from the gaseous fluid as far as possible before it reaches the choke orifice. Furthermore, at the orifice I arrange a non-conductor of heat separating the cold side of the opening from the upstream side, so that the condensed moisture will be carried away and the temperature on the entrance to the orifice will not fall below the freezing point. Also the assembly is arranged so that it may be cleared of condensed moisture whenever it becomes necessary to do so.

I thus provide a device in which the gaseous fluid may be greatly reduced in pressure without the choking of the fluid conducting line with frozen moisture and I will be enabled to operate the device for long periods without the necessity of stopping to thaw the ice from the choke nozzle.

What I claim as new is:

1. A device of the character described including a casing, a fluid conducting pipe extending longitudinally of said casing, a choke orifice in said pipe within said casing, a nipple of heat insulating material on the downstream side of said orifice through which said fluid passes from said orifice, and a pipe leading from said casing to conduct the high pressure fluid through said casing and into the upstream end of said pipe and to said orifice.

2. A device of the character described comprising an elongated casing, a fluid conducting pipe extending longitudinally through said casing and having fluid tight engagement therewith, a choke orifice in said pipe within said casing, a nipple on the downstream side of said orifice having a passage flaring outwardly away from said orifice, said nipple being of heat-insulating material, and means to conduct gaseous fluid under pressure through said casing around said pipe and out of said casing and back to the upstream end of said pipe.

3. A device of the character described comprising an elongated casing, a fluid conducting pipe extending longitudinally through said casing and having fluid tight engagement therewith, a choke orifice in said pipe within said casing, a nipple on the downstream side of said orifice having a passage flaring outwardly away from said orifice, said nipple being of heat-insulating material, and means to conduct gaseous fluid under pressure through said casing around said pipe and nipple and out of said casing back to the upstream end of said pipe, and a drain to carry off moisture condensing around the downstream portion of said pipe.

4. A choke device for gaseous fluid, including a plurality of elongated casings, a fluid conducting pipe extending longitudinally through one of said casings, a choke in said pipe, an expansion pipe connecting said choke and a second of said casings, an outlet from said second casing, means to conduct incoming fluid into said first mentioned casing around said fluid conducting pipe, and a flow pipe from said first casing through said second casing and connecting with the upstream end of said fluid conducting pipe.

5. A choke device for gaseous fluid, including a plurality of elongated casings, a fluid conducting pipe extending longitudinally through one of said casings, a choke in said pipe, a nipple of heat-insulating material on the downstream side of said choke, an expansion pipe connecting said choke and a second of said casings, an outlet from said second casing, means to conduct incoming fluid into said first mentioned casing around said fluid conducting pipe, and a flow pipe from said first casing through said second casing and connecting with the upstream end of said fluid conducting pipe.

6. In combination a pipe for conducting gaseous fluid under pressure, a choke orifice in said pipe, and an expansion nipple on the downstream side of said orifice, said nipple being of heat insulating material and flaring outwardly away from said orifice, and means to conduct incoming fluid over said nipple to cool said fluid.

7. In combination a pipe for conducting gaseous fluid under pressure, a choke orifice in said pipe, and an expansion nipple on the downstream side of said orifice, said nipple being of heat insulating material, and means to condense moisture from said gaseous fluid before it reaches said orifice, including a chamber surrounding said orifice and said pipe on both ends of said orifice, said fluid being conducted through said chamber to the pipe upstream from said housing.

8. In combination, a fluid conducting line for gaseous fluid under pressure, a choke in said line of materially smaller diameter than said line, means in said line to condense moisture from said gaseous fluid on the upstream side of said choke, and means on the downstream side of said choke to limit the transfer of heat from the upstream side thereof.

GORHAM W. WOODS.